United States Patent [19]

Virkar et al.

[11] Patent Number: 4,678,761
[45] Date of Patent: Jul. 7, 1987

[54] SINTERABLE AND STRENGTHENED MAGNESIUM OXIDE CERAMIC MATERIALS

[75] Inventors: Anil Virkar; Thomas C. Yuan, both of Salt Lake City, Utah

[73] Assignee: The Dow Chemical Company, Midland, Mich.

[21] Appl. No.: 792,479

[22] Filed: Oct. 29, 1985

Related U.S. Application Data

[63] Continuation-in-part of Ser. No. 665,912, Oct. 29, 1984.

[51] Int. Cl.[4] .......................................... C04B 35/48
[52] U.S. Cl. .................................. 501/104; 501/108; 501/112; 501/121; 264/56; 264/65; 264/125; 264/332

[58] Field of Search .............. 501/108, 112, 121, 103, 501/104; 264/56, 65, 125, 332

[56] References Cited

U.S. PATENT DOCUMENTS

| | | | |
|---|---|---|---|
| 3,556,823 | 1/1971 | Sano et al. | 501/108 |
| 3,578,473 | 5/1971 | Alper et al. | 501/108 |
| 4,298,385 | 11/1981 | Claussen et al. | 501/108 |
| 4,397,962 | 8/1983 | Schockmel | 501/112 |

Primary Examiner—Stephen J. Lechert, Jr.
Attorney, Agent, or Firm—Trask, Britt & Rossa

[57] ABSTRACT

Magnesium oxide ceramic bodies may be strengthened by inclusion of zirconium oxide particles, and may be further sintered to a density approaching theoretical density by conventional sintering techniques by inclusion of sintering aids, such as manganese oxide and iron oxide.

19 Claims, 6 Drawing Figures

SINTERABLE AND STRENGTHENED MAGNESIUM OXIDE CERAMIC MATERIALS

RELATED APPLICATIONS

This application is a continuation-in-part of patent application Ser. No. 665,912 filed Oct. 29, 1984 entitled "Ceramic Bodies Having a Plurality of Stress Zones" by Anil V. Virkar.

BACKGROUND OF THE INVENTION

1. Field: This invention relates to magnesium oxide compositions, and particularly to magnesium oxide compositions which have been modified to improve strength and sinterability.

2. Prior Art: The production of ceramic bodies from magnesium oxide has long been practiced. Generally, sintering of magnesium oxide ceramic bodies has been done either by hot-pressing or by hot isostatic pressing. Both of these techniques require the application of pressure at elevated temperatures to achieve the appropriate densification of the magnesium oxide material into a relatively strong ceramic body. Even under pressurized sintering conditions, magnesium oxide has generally not possessed the strength of other well-known ceramic materials, such as alumina, silicon carbide, silicon nitride, and the like.

Ceramic bodies of magnesium oxide have generally been employed in instances where particular attributes of magnesium oxide were useful even though such bodies were not especially strong. Such attributes include a low thermal conductivity, high coefficient of thermal expansion, and high melting point. Such uses have not been fully exploited due to the somewhat lower overall strength and fracture toughness of magnesium oxide bodies including ones which have been prepared by pressurized sintering.

Attempts to sinter magnesium oxide bodies in the absence of pressure have generally required fairly high sintering temperatures, that is, sintering temperatures significantly above 1400° C. Sintering temperatures in this range tend to promote grain growth of crystals within the ceramic particles. This generally tends to diminish the overall strength and fracture toughness of the resulting ceramic body.

One of the advantages of pressurized sintering is that some of the compaction which is desired during sintering is accomplished by the high pressure involved. Thus, during pressurized sintering, lower sintering temperatures may be employed for short periods of time. This is desirable since deleterious grain growth is a function of residence time and temperature.

Techniques for improving the strength of many types of ceramics, such as alumina, beta-alumina, silicon nitride and the like have involved the inclusion of zirconium oxide which transforms from a tetragonal crystal state to a monoclinic crystal state to provide a toughened article. U.S. patents relating to such compositions include: U.S. Pat. Nos. 4,298,385 and 4,322,249 of Claussen, et al.; 4,184,882 and 4,187,116 of Lange; and 4,218,253 of Dwarok, et al.

In an article published in 1985, subsequent to the filing date of October 1984 of the parent application, Ser. No. 665,912, authors Ikuma, et al. discuss transformation toughening of ceramics generally and, in particular, certain of their work which included magnesium oxide bodies containing zirconium oxide; "$ZrO_2$-Toughened MgO and Critical Factors in Toughening Ceramic materials by Incorporating Zirconia," *Journal of Materials Science Letters* 4 (1985) 63–66.

SUMMARY OF THE INVENTION

The instant invention comprises magnesium oxide ceramic bodies which contain a sintering aid of a metallic oxide wherein the metal portion of the oxide has an ionic radius substantially similar to magnesium, and has valence states greater than +2, and especially valence states of +3, +4 or more. Particular sintering aids found effective in the invention are manganese oxide, iron oxide, and the like. Such sintering aids have been found effective when included in very minor amounts, that is, usually less than about 5% by weight of sintering aid based upon the weight of magnesium oxide present. Particularly good results have been achieved when the sintering aid has been present at less than about 2% by weight.

Also, the invention comprises magnesium oxide bodies incorporating zirconium oxide, hafnium oxide, or the like, which act to toughen the magnesium oxide body. Zirconium oxide or hafnium oxide is generally present in an amount less than 50% by volume of the magnesium oxide present in the ceramic body, and generally less than about 40% by volume, and particularly less than about 30% by volume.

Zirconia- or hafnia-toughened magnesium oxide ceramic bodies may be prepared by pressurized sintering, that is, hot-pressing or hot isostatic pressing, or by conventional sintering by the inclusion of an appropriate sintering aid of the type identified herein.

A sintered ceramic body of this invention comprises magnesium oxide and a very minor amount of a metal oxide having the formula $AO_x$ wherein A is a metal which has a valence state greater than +2 and has an ionic radius substantially similar to a magnesium ion and x is a number having a value greater than one-half the valence state of A.

DESCRIPTION OF THE INVENTION

Figure 1:
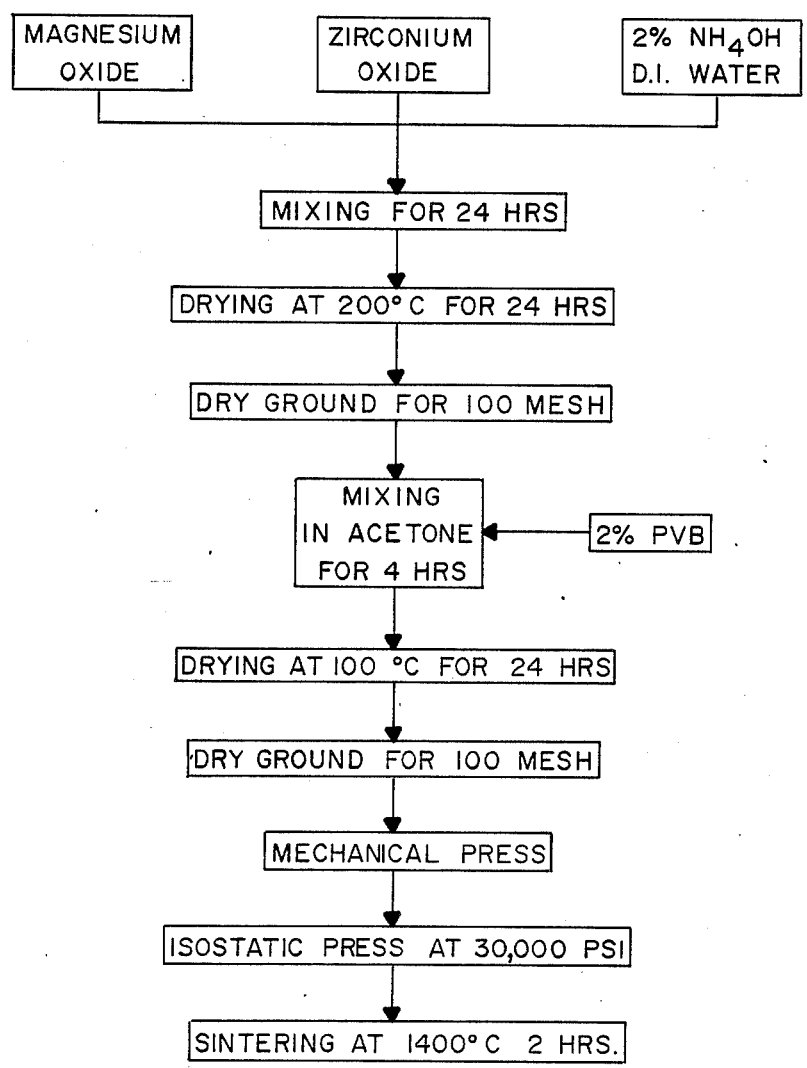
FIG. 1 is a flow sheet depicting processing of a toughened composite magnesia-zirconia.

The instant invention comprises magnesium oxide ceramic bodies which may be prepared at relatively low sintering temperatures in the absence of pressure to form very dense, strong bodies. Such magnesium oxide compositions contain a sintering aid such as manganese oxide, iron oxide, or the like, and are sintered in the absence of pressure at temperatures generally in the range of about 1400° C. or below, and particularly at sintering temperatures below about 1300° C. with good results being achieved at temperatures as low as 1250° C. Such compositions may be toughened by inclusion of zirconia or hafnia particles distributed throughout the ceramic body for the purpose of toughening that body.

In toughening with hafnia or zirconia, it is important to maintain the sintering temperatures in a range whereby the tetragonal crystal form of zirconia or hafnia is maintained. Toughened bodies of magnesium oxide contain the magnesium oxide as a predominant material contributing to the formation of the matrix of the body.

The compositions of the instant invention are particularly unique inasmuch as their processing may be done according to conventional ceramic processing techniques to obtain a densified ceramic body.

Dense bodies of magnesium oxide may be prepared by admixing finely ground particles of magnesium oxide with a sintering aid such as manganese oxide, iron oxide, or the like for a sufficient period of time to obtain a substantially uniform admixture. This admixing may be done dry or in a wet state in the presence of deionized water containing 2% ammonium hydroxide. If done in a wet state, the admixture is then dried at an appropriate temperature, for example, about 200° C. for a sufficient time to drive off the water.

The material then may be dry ground for a sufficient period of time to achieve an appropriate particle size which, for purposes of this invention, is generally less than about 50 mesh, and preferably less than about 100 mesh. The ground material is mixed in acetone with a binder solution such as 2% polyvinyl butyral solution.

Again, the material is dried at a sufficient temperature and time period to dry the material so that it may be further processed. Optionally, the material may then be again ground so that it preferably passes through a 100 mesh screen. If the material is processed in its dry condition, it is then mechanically pressed to an appropriate shape, and then sintered under conventional conditions at a temperature generally below about 1400° C. for a sufficient period of time to achieve a desired density. Generally a time period of less than about three hours is sufficient, depending upon the size of the ceramic body, and frequently two hours or less is sufficient.

A particular advantage of the instant invention is that ceramic bodies may be formed by slip casting, extrusion, mechanical pressing, and other conventional ceramic processing techniques used to achieve a particular shape or configuration of ceramic body. Complex shapes of ceramic bodies generally cannot be readily sintered either by hot-pressing or hot isostatic pressing. It is possible to hot isostatically press a complex shape, but the shape must be relatively nonporous in order to achieve densification.

Ceramic bodies prepared by this technique may include zirconium oxide or hafnium oxide as well as a sintering aid. The inclusion of zirconium oxide or hafnium oxide in the composition does not require different processing techniques. However, compositions containing no sintering aid, such as manganese oxide, iron oxide, or the like, but containing hafnia or zirconia may be processed by hot-pressing or hot isostatic pressing techniques to achieve a strong, tough, dense ceramic body. Such bodies may be hot-pressed at temperatures of about 1300° C. or lower at about 4000 psi. or more for a short period of time, for example, for about 10 minutes or so to achieve substantially complete densification.

It should be noted that while zirconia or hafnia-modified-magnesium oxide compositions are readily sinterable under pressurized sintering techniques without a sintering aid, the presence of sintering aids disclosed herein can facilitate such pressurized sintering.

The particular sintering aids useful in the instant invention are those metal oxides in which the metal has a valence state greater than +2. Also, the metal ion of the sintering aid should have an ionic radius substantially similar to that of the magnesium ion. Sintering aids such as manganese oxide, iron oxide, titanium dioxide, alumina, chromia, and the like may be utilized. Manganese oxide and iron oxide are particulary effective with especially good results being obtained with manganese oxide. The presence of very small quantities of such sintering aids gives outstanding results, generally with amounts of a few tenths of a percent by weight sintering aid, based upon the weight of magnesium oxide present, up to a weight of about 2% by weight being preferred.

As amounts of sintering aid are included beyond about 2% by weight, some diminishment of densification has been observed such that the presence of about 3% by weight or more, and especially above about 5% or more by weight of the sintering aid appears less effective than the use of smaller proportions of such sintering aids. The presence of larger quantities of sintering aid, however, still produces magnesium oxide bodies which are sinterable by conventional techniques and possess theoretical densities which are generally higher than the theoretical densities obtainable by conventional sintering of magnesium oxide in the complete absence of such sintering aids.

As indicated herein, zirconia or hafnia may be included in magnesium oxide bodies for toughening purposes. Such bodies may be processed via conventional sintering techniques when the body contains a sintering aid, or by pressurized sintering in the absence of one of the sintering aids disclosed herein. Zirconia or hafnia is generally included in amounts from about 5% by volume of magnesium oxide up to about 50% by volume, and particularly in a range of about 10% by volume to about 40% by volume. Especially desirable results may be achieved in a weight range of about 15% to about 30% by volume zirconia or hafnia. Further understanding of the invention may be facilitated by reference to the following example.

EXAMPLE I

Powder Processing

In the preparation of samples, MgO and $ZrO_2$ from commercial sources have been used. Wet mixing of MgO and $ZrO_2$ using an aqueous medium has been found to give good dispersion at a pH greater than 12. Presumably, the zeta potential of MgO and $ZrO_2$ must be of opposite signs at this pH. Studies have shown that hot-pressed discs of material mixed in alkaline solution are much more uniform in comparison with those mixed in the acidic range. Thus, 2% $NH_4OH$ in deionized water was used for dispersing MgO and $ZrO_2$. For samples doped with MnO, either commercial MnO (or $MnO_2$) which was mechanically mixed in, or $Mn(NO_3)_2$ was used as the source of manganese. Zirconium oxide milling media were used for milling the powders. The powder mixture was wet milled for 24 hours. The final mixture was dried at 200° C. for 24 hours and calcined at 500° C. for 4 hours to precipitate MnO. Flow charts given in FIGS. 1 and 2 describe the process schematically.

For attaining high toughness and strength in the sintered ceramic body, it is essential that $ZrO_2$ be retained in the tetragonal form at room temperature. This tetragonal $ZrO_2$ must be on the verge of conversion such that upon grinding, the particles convert into monoclinic polymorph. As the monoclinic polymorph is a low density form, a state of compression is created which effectively enhances strength and toughness. It is desirable to have a narrow size particle distribution. This can be achieved by repeated milling and calcining operations.

Fabrication

Fabrication was achieved by either uniaxial hot-pressing or sintering. Uniaxial hot-pressing was achieved in graphite dies at a temperature of 1300° C. under a pressure of 4000 psi. for 10 minutes. The density attained by hot-pressing was typically at least about 99% of the theoretical.

Coventional sintering of MgO-MnO and MgO-MnO-$ZrO_2$ ceramics of this example was achieved in open air at a temperature of 1400° C. Conventional sintering of such compositions can be achieved, however, at a temperature as low as 1275° C.

Figure 3:
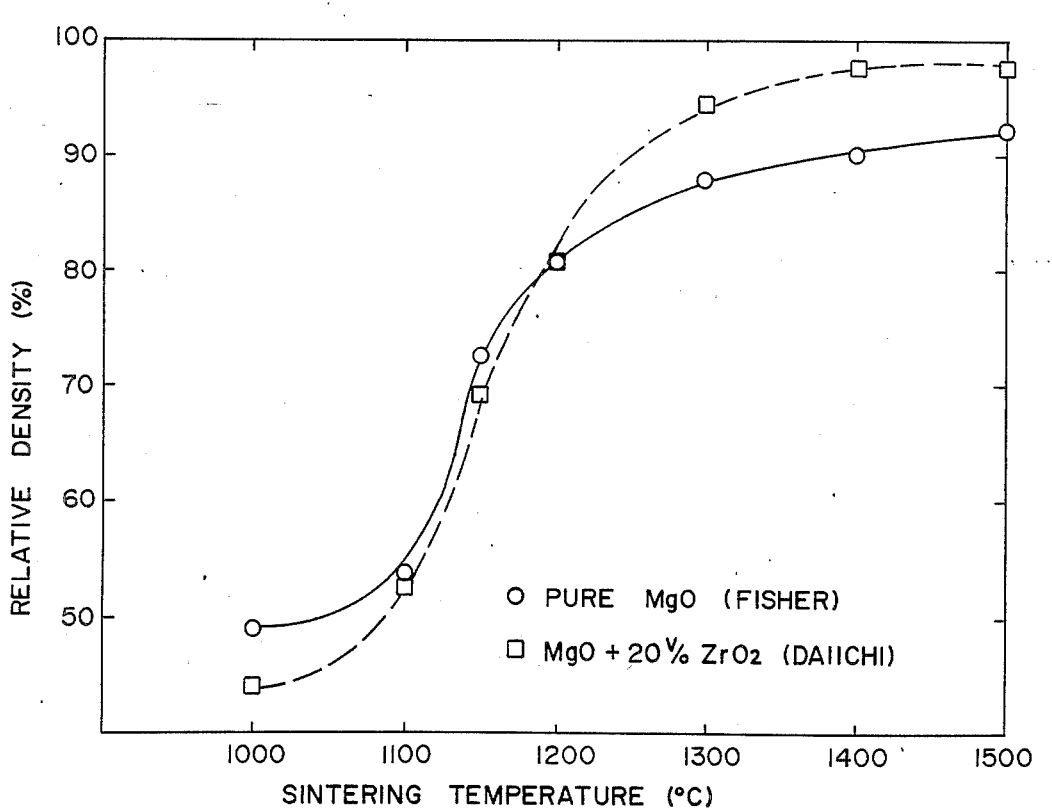
FIG. 3 is a graph illustrating a comparison in densification of a pure magnesia ceramic compared with a magnesia-zirconia composite.

Densification curves of hot-pressed pure MgO and MgO/$ZrO_2$ ceramics are shown in FIG. 3. The data of FIG. 3 indicate that at sintering temperatures in excess of 1100° C. additions of $ZrO_2$ have a beneficial effect on densification.

Figure 4:
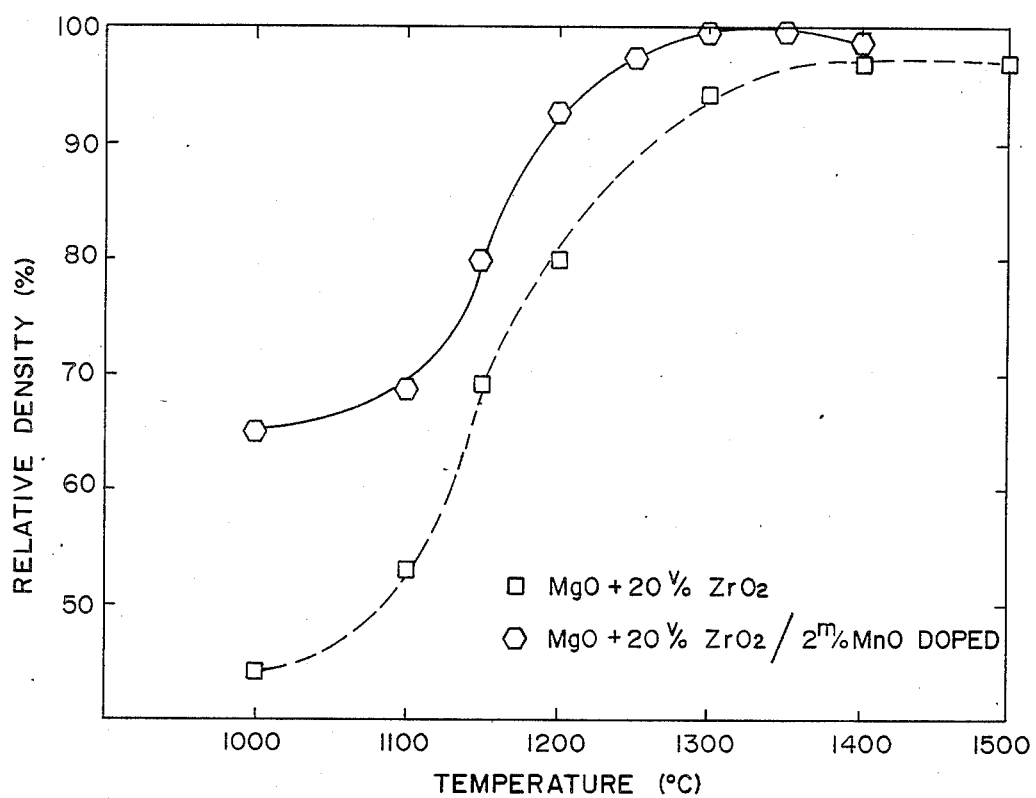
FIG. 4 is a graph illustrating a comparison in densification of a magnesia-zirconia composite containing a minor quantity of manganese oxide.

FIG. 4 shows the dependence of density on concentration of MnO in MgO-MnO ceramics, and Table I gives the relevant details on individual samples. In the case of MgO-$ZrO_2$-MnO ceramics, the typical concentration of MnO was between 2% to 5%. The pertinent details are given in Table II.

TABLE I

Experimental Data of Densities for
MgO—MnO Samples With Different MgO Content

| Experiment Number* | MgO/MnO in wt % | $\rho$ Theoretical (g/cc)** | $\rho$ Normalized (%)*** |
|---|---|---|---|
| A | 70/30 | 3.946 | 89.5 |
| A | 90/10 | 3.690 | 94.0 |
| B | 85/15 | 3.749 | 91.1 |
| B | 90/10 | 3.690 | 91.7 |
| B | 95/05 | 3.634 | 93.8 |
| C | 70/30 | 3.946 | 92.7 |
| C | 95/05 | 3.634 | 93.1 |
| C | 97/03 | 3.612 | 93.0 |
| C | 99/01 | 3.591 | 97.6 |
| D | 85/15 | 3.749 | 93.0 |
| D | 97/03 | 3.612 | 94.4 |

*Samples with same experiment number were sintered at the same time. All experiments were done at a firing temperature of 1400° C. for 2 hours in open air in the absence of pressure.
**$\rho$theoretical = $\rho$MgO.$^N$MgO + $\rho$MnO.$^N$MnO where $^N$MgO and $^N$MnO is the molar percent of MgO and MnO, respectively.
***$\rho$normal = $\rho$experimental/$\rho$theoretical where experimental = $W$dry/$W$dry−$W$ in water.

TABLE II

Normalized Density of MgO—$ZrO_2$—MnO Samples*

| MgO/$ZrO_2$/MnO Molar Ratio | $\rho$ Theoretical (g/cc) | $\rho$ Normalized (%) |
|---|---|---|
| 86.8/8.20/5 | 3.962 | 97.0 |
| 82.2/7.80/10 | 3.879 | 98.5 |
| 89.9/6.55/3.55 | 3.811 | 98.3 |
| 82.2/7.80/10 | 3.962 | 98.5 |
| 82.2/7.80/10 | 3.962 | 99.6 |

*All these samples were sintered in air at 1400° C. for 2 hours.

Samples of magnesia (Table III) containing 20% by volume zirconium oxide from different commercial sources, samples 105 through 106, were hot-pressed at 1300° C. One sample was post-annealed. Other samples, which included additional quantitites of manganese oxide, samples S101 and S102, were sintered conventionally, i.e., in the absence of pressure. One sample of pure magnesium oxide without any $ZrO_2$ or $MnO_2$, sample M100, was hot-pressed for purposes of comparison. Description of these sample compositions sintering and post-sintering treatment is set forth in Table III.

In Table IV are tabulated the densification, strength and toughness properties of the samples whose compositions sintering techniques are set forth in Table III. All samples exhibited densification values of at least 98% of theoretical. These data are significant in several respects, namely: (1) excellent densification of MgO/$ZrO_2$/MnO samples occurred without the necessity of hot-press sintering; (2) hot-pressed MgO/$ZrO_2$ samples exhibited an average bending strength significantly greater than pure MgO which was also hot-press sintered, (3) MgO/$ZrO_2$/MnO samples which were conventionally sintered were substantially equivalent to the strengths of the hot-pressed MgO/$ZrO_2$ samples.

TABLE III

Processing Parameters in
MgO—20 v/o $ZrO_2$ Composite Study

| Samples | $ZrO_2$ Source | Process |
|---|---|---|
| 105 | Zircar* | Hot-pressed at 1300° C., 4000 psi., 10 mins. |
| 105$_{2d}$ | Zircar | Hot-pressed at 1300° C., 4000 psi., 10 mins. Annealed at 1250° C., 48 hrs. |
| 106 | Harshaw** | Hot-pressed at 1300° C., 4000 psi., 10 mins. |
| S101 | Zircar (1 m/o MnO doped) | Sintered in air w/o pressure at 1400° C., 2 hrs. |
| S102 | Zircar (2 m/o MnO doped) | Sintered in air w/o pressure at 1400° C., 2 hrs. |
| M100 | Pure MgO | Hot-pressed at 1400° C., 4000 psi., 10 mins. |

*Zircar Products, Inc., New York, U.S.A.
**The Harshaw Chemical Co., Ohio, U.S.A.

Mechanical and Physical Characterization

Fracture strength was determined in four point bending in air on an Instron Machine. Fracture toughness $K_{IC}$ was determined using the indentation technique with Vickers indentor. The pertinent details regarding processing (with sample nomenclature) and mechanical properties are given in Tables II and IV respectively.

TABLE IV

Bending Strength and Fracture Toughness
of MgO—20 v/o $ZrO_2$ Composite

| Samples | Percent Of Theoretical Density | Bending Strength (MPa) | Bending Strength (psi) | Fracture Toughness $K_{IC}$(MPz $^{-3/2}$) |
|---|---|---|---|---|
| 105 | 98.5 | 257 | 37,000 | 3.3 |
| 105$_{2d}$ | 98.5 | 139 | 20,000 | — |
| 106 | 99.0 | 360 | 52,000 | 3.9 |
| S101 | 98.0 | 246 | 35,000 | — |
| S102 | 98.0 | 298 | 43,000 | — |
| M100 | 99.6 | 212 | 31,000 | — |

The samples whose data are set forth in Table V were prepared in a manner similar to that set forth in FIG. 1, except that the samples of Table V were hot-pressed. Various ratios of MgO:$ZrO_2$ were utilized with varying sintering temperatures and varying sintering times. A pure MgO sample was similarly prepared for comparison purposes The data of Table V generally indicate that the fracture strength of MgO/ZrO$_2$ ceramics increases with increasing preparations of zirconia, for example, strengths as high as 81,000; however, it is significant that a ceramic which is 60%/40% by volume of MgO/ZrO$_2$ exhibits a strength nearly as great as an MgO/ZrO$_2$ ceramic which is 20%/80% by volume. In each instance, the strengths of the MgO/ZrO$_2$ ceramics, even as low as 20% by volume ZrO$_2$, were significantly greater than a hot-pressed pure MgO ceramic. In evaluating the data of Table V, consideration must be given to the various sintering temperatures and times which were utilized since grain growth, which is usually inimicable to strength, is enhanced by higher temperatures and longer times of sintering.

TABLE V

Bending Strength of Uniaxial Hot-Pressed MgO—ZrO$_2$ Ceramics

| Samples | Process | Relative Density | Fracture Strength (MPa) | (psi) |
|---|---|---|---|---|
| MgO + 20% ZrO$_2$ | 1300° C./3500 psi/10 min. | 99.0 | 320 | 46,000 |
| MgO + 40% ZrO$_2$ | 1400° C./3500 psi/20 min. | 97.6 | 483 | 70,000 |
| MgO + 60% ZrO$_2$ | 1400° C./3500 psi/30 min. | 95.6 | 422 | 61,000 |
| MgO + 80% ZrO$_2$ | 1400° C./3500 psi/40 min. | 95.4 | 561 | 81,000 |
| MgO | 1400° C./4000 psi/10 min. | 99.6 | 212 | 31,000 |

ZrO$_2$ - Daiichi

Figure 2:
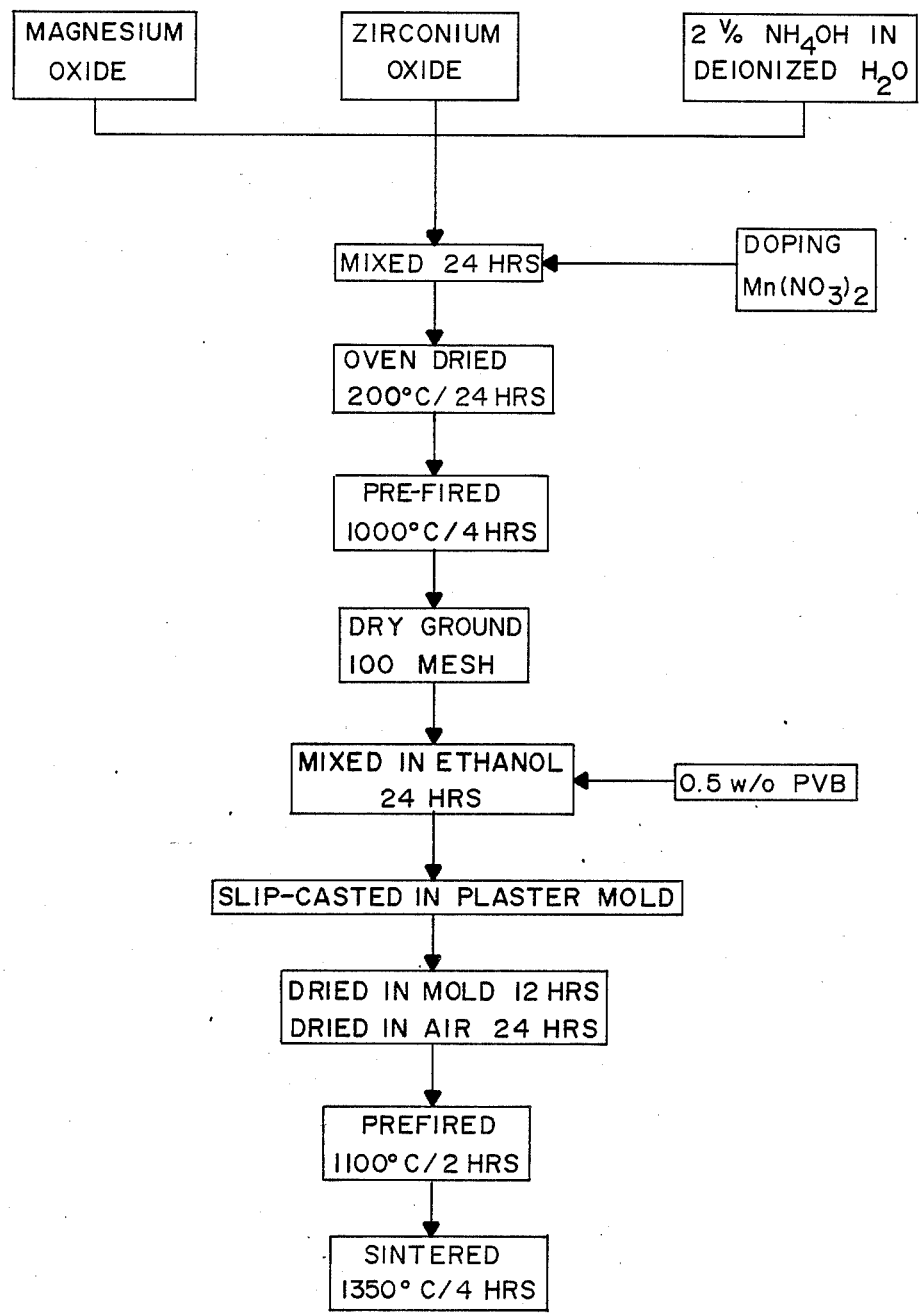
FIG. 2 is a flow sheet depicting a slip-casting process for forming a magnesia-zirconia composite.

Samples 6a and 6b illustrated in Table VI were prepared according to the process of FIG. 1, while sample 6c was prepared according to FIG. 2. Sample 6b with 2% MnO$_2$ achieved a higher density and strength than the 1% MnO$_2$ sample. The slip cast sample containing 3% MnO$_2$ achieved an excellent density and strength.

The magnesia-zirconia composites were prepared generally in accordance with the processing techniques illustrated in FIGS. 1 and 2. MgO utilized was an electronic grade available as finer particles. The ZrO$_2$ powder had a high purity and a narrow particle size distribution.

TABLE VI

Bending Strength of Sintered MgO—ZrO$_2$ Ceramics

| Samples | Process | Relative Density | Strength (MPa) | (psi) |
|---|---|---|---|---|
| (6a) MgO + 20% ZrO$_2$*/1% MnO | 1400° C./2 hrs. | 97.8 | 246 | 35,000 |
| (6b) MgO + 20% ZrO$_2$*/2% MnO | 1400° C./2 hrs. | 98.8 | 298 | 43,000 |
| (6c) Slip Cast MgO + 20% ZrO$_2$*/1% MnO | 1350° C./4 hrs. | 99.6 | 487 | 71,000 |

ZrO$_2$* - Zircar

In FIG. 3, densification curves for pure MgO samples and 80 MgO-20 ZrO$_2$ samples are shown. The MgO-ZrO$_2$ samples achieved a higher densification overall and also became denser at lower temperatures.

In FIG. 4, samples of 80 MgO-20 ZrO$_2$ and samples of 80 MgO-20 ZrO$_2$ containing 2% by volume of manganese oxide were conventionally sintered. Higher densities were achieved for the manganese oxide-containing samples. Densification temperatures of about 1250° C. to 1350° C. appeared optimum for the manganese oxide-containing samples, which gave better results than the MgO-ZrO$_2$ samples sintered at higher temperatures.

Figure 5:
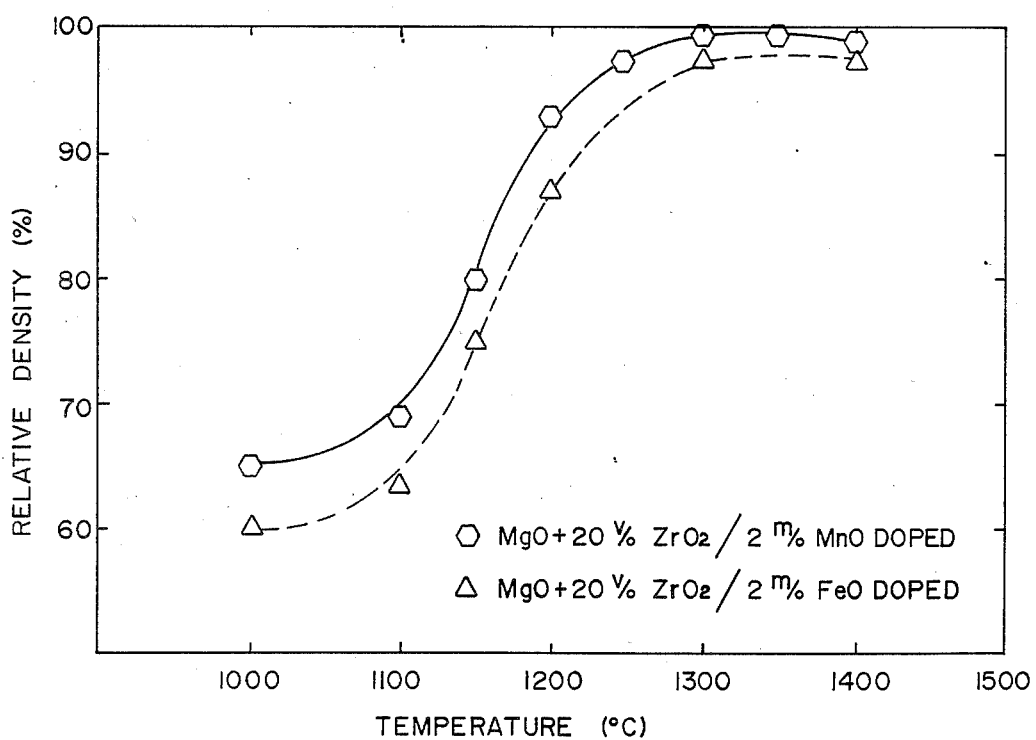
FIG. 5 is a graph depicting a comparison in densification of a magnesia-zirconia-manganese oxide composite with a magnesia-zirconia-iron oxide composite.

Samples of 80 MgO-20ZrO$_2$ containing 2% by volume manganese oxide and 2% by volume iron oxide were sintered. Comparisons of density-temperature correlations are illustrated in FIG. 5. In general, MnO$_2$ appears to give slightly better results than the iron oxide-containing samples; however, the sintering curves were quite parallel. The iron oxide-treated samples in comparison with the pure MgO and MgO-ZrO$_2$ samples illustrated in FIGS. 3 and 4 indicate an improvement achieved by incorporation of iron oxide.

Figure 6:
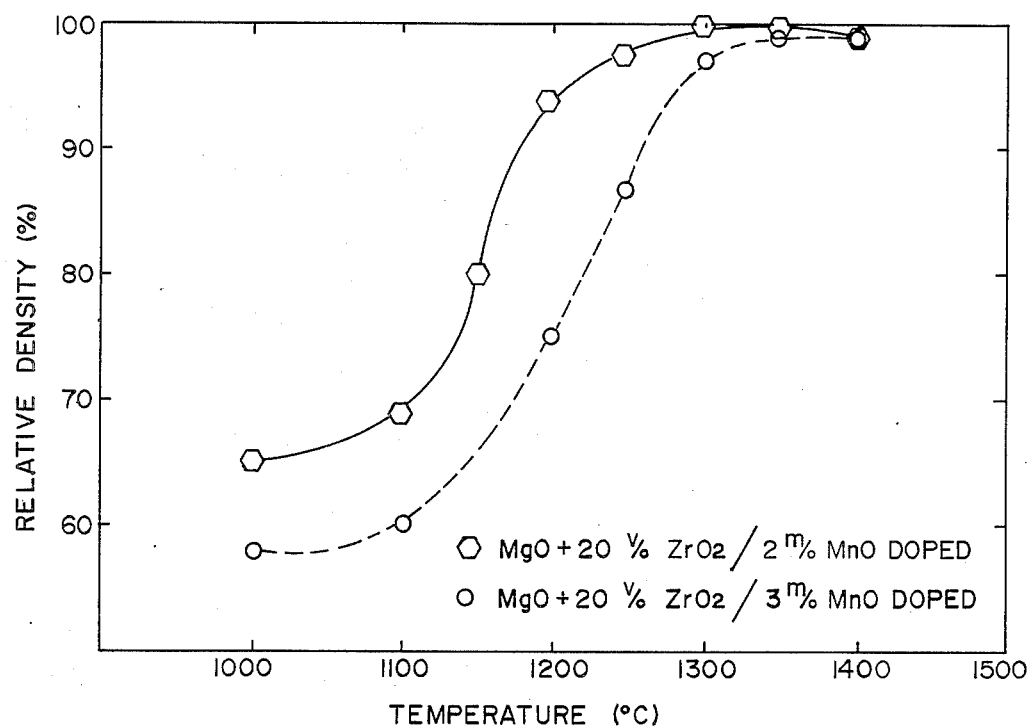
FIG. 6 is a graph comparing densification of magnesia-zirconia composite containing differing quantities of manganese oxide.

In FIG. 6, a comparison is illustrated between MgO-ZrO$_2$ samples containing 2% by volume MnO with samples containing 3% by volume MnO. In general, the 2% MnO samples appeared to densify better than those containing 3% MnO at lower temperatures. However, the 3% MnO samples at temperatures above about 1300° C. densified very well.

Although the exact mechanism of the operation of sintering aids of the instant invention is not fully understood, it is hypothesized that the metal ion of the sintering aid, for example manganese, substitutes for the magnesium ion in the lattice structure. It is postulated that the magnesium ion is the slower moving ion in the mass diffusion process involved in sintering. It is thought for this reason that pure magnesium oxide does not sinter effectively by pressureless sintering because the time required for mass diffusion is too long at the sintering temperature, so that unacceptable grain growth occurs. Thus, if vacancies for the magnesium ion are created in a lattice structure, then the mass ionic diffusion of the magnesium may be enhanced. Thus, the presence of a sintering aid such as manganese oxide, which has more oxygen present per manganese ion than is present in the magnesium oxide (in magnesium oxide, the magnesium to oxygen ion ratio is 1:1), so that in the lattice structure an extra oxygen ion position may be created which then creates a vacancy for a metal oxide ion so that then magnesium ions may move more rapidly to such a vacancy.

In the above example, subsitution of iron oxide for manganese oxide tends to provide ceramic compositions which, when processed in a similar manner, give similar results.

Inclusion of other sintering aids, such as titanium oxide, aluminum oxide, chromium oxide, and the like, which have a similar metal ionic radius to that of magnesium, and which have a multiple valence state in which at least one of the valence states is greater than +2, are also useful in the instant invention.

We claim:

1. A sintered ceramic body comprising magnesium oxide and a very minor amount of a metal oxide having the formula $AO_x$ wherein A is a metal selected from the class consisting of manganese and iron which has a valence state greater than +2 and has an ionic radius substantially similar to the magnesium ion and x is a number having a value greater than one-half the valence state of A.

2. The body of claim 1 wherein said manganese oxide or iron oxide is present as about 5% or less by weight of said magnesium oxide present.

3. The body of claim 1 wherein said manganese oxide or iron oxide is present as about 2% or less by weight of said magnesium oxide present.

4. The body of claim 1 wherein said manganese oxide or iron oxide has at least some manganese or iron ions with a valence greater than 2.

5. The body of claim 1 wherein zirconium oxide is additionally present.

6. The body of claim 1 wherein said zirconium oxide is present as a volumetric proportion which is no greater than that of magnesium oxide.

7. The body of claim 1 wherein its density is at least 90% of theoretical.

8. The body of claim 5 wherein at least a portion of said zirconium oxide is present in the tetragonal crystal form.

9. A green ceramic body comprising magnesium oxide particles and a very minor amount of manganese oxide or iron oxide particles interspersed therein.

10. The green ceramic body of claim 9 wherein particles of zirconia or hafnia are additionally interspersed therein.

11. A sintered ceramic body comprising magnesium oxide and zirconium oxide or hafnium oxide, said magnesium oxide being present in a predominant amount.

12. The sintered ceramic body of claim 11 wherein said zirconium oxide or hafnium oxide is present substantially in tetragonal crystal form.

13. The sintered ceramic body of claim 11 wherein said zirconium oxide or hafnium oxide is present in at least minor quanitities of monoclinic crystal form.

14. A process for sintering bodies of magnesium oxide comprising: admixing minor quantities of manganese oxide or iron oxide
 particles with magnesium oxide particles; forming said mixture of particles into a green body; and sintering said green body into a sintered body.

15. The process of claim 14 wherein said manganese oxide or iron oxide particles are present as about 2% or less by weight of said magnesium oxide.

16. The process of claim 14 wherein said sintering is conducted in the absence of pressure.

17. The process of claim 14 wherein said sintering is conducted at a temperature of about 1250° C. to about 1400° C.

18. The process of claim 14 wherein zirconia or hafnia particles are admixed with said magnesium oxide particles.

19. The process of claim 18 wherein said sintering is conducted in the presence of pressure.

* * * * *